Figure 1:
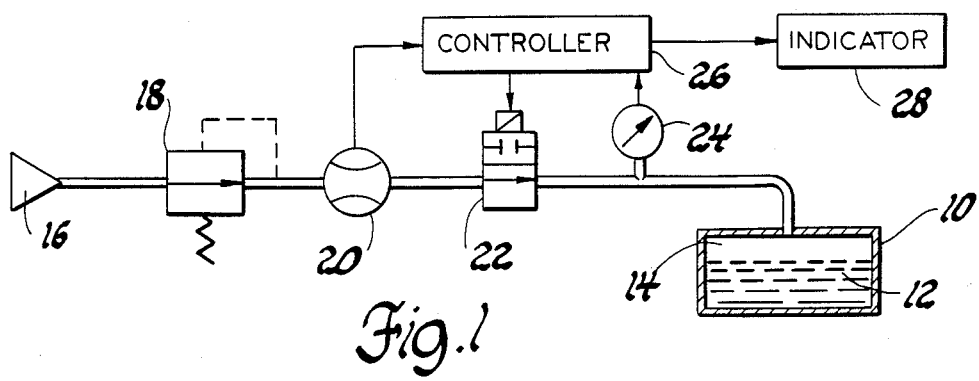

United States Patent [19]

Dodge

[11] Patent Number: 4,575,807
[45] Date of Patent: Mar. 11, 1986

[54] METHOD AND APPARATUS FOR LEAK TEST

[75] Inventor: Roger C. Dodge, Taylor, Mich.

[73] Assignee: General Motors Corporation, Detroit, Mich.

[21] Appl. No.: 527,099

[22] Filed: Aug. 29, 1983

[51] Int. Cl.⁴ .......................... G01M 3/26; G01N 7/00
[52] U.S. Cl. .......................................... 364/558; 73/40; 340/605; 364/510
[58] Field of Search ................. 73/1 H, 40, 45.8, 49.4, 73/861.39, 861.46, 861.49, 49.2; 364/509, 510, 558, 564; 340/605

[56] References Cited

U.S. PATENT DOCUMENTS

| | | | |
|---|---|---|---|
| 3,918,291 | 11/1975 | Pauly et al. | 73/40 |
| 4,269,061 | 5/1981 | Hatsuno et al. | 73/40 |
| 4,494,402 | 1/1985 | Carney | 73/40 |
| 4,502,842 | 3/1985 | Currier et al. | 364/558 X |
| 4,523,452 | 6/1985 | Brayman | 73/40 |

*Primary Examiner*—Errol A. Krass
*Assistant Examiner*—Kevin J. Teska
*Attorney, Agent, or Firm*—Warren D. Hill

[57] ABSTRACT

To measure the leak rate in a transmission partially filled with a transmission fluid but having an air space of unknown volume, air is supplied to the transmission to pressurize the cavity to a preset value. The flow rate of air to the transmission is measured and that rate is integrated in a computer to determine the mass air flow which is proportional to the volume of the air space in the transmission. The decline of pressure in the air space as a result of fluid leakage from the transmission is monitored by the computer and the leak rate is determined on the basis of that rate and the derived volume of the air space.

4 Claims, 2 Drawing Figures

METHOD AND APPARATUS FOR LEAK TEST

This invention relates to a method and apparatus for measuring fluid leaks from a vessel having an air space and, more particularly, to such testing where the size of the air space in the vessel is not known.

Previously several methods and apparatuses have been used to measure the leak rate from a closed container. Generally, these involve the pressurizing of the container with air or other gas and monitoring the decrease in pressure of the pressurized vessel, whereby the rate of pressure decline is directly proportional to the leak rate of the vessel. To accomplish this measurement, the volume of the vessel, if empty, or the air space in the vessel if it is partially filled with liquid must be known. Heretofore, the attempts to use the known method of measuring the leak rate of the vessel where the air capacity of the vessel was uncertain yielded results having an equal uncertainty.

In the testing of automotive transmissions during manufacture, the transmissions are filled to approximately the normal fill level with transmission fluid and then the transmissions are tested for fluid leaks. There is an air cavity in each transmission but the exact volume of the air space is not known because of variations from one transmission housing casting to another and variations in the fill level of transmission fluid. The previously known methods of measuring leakage, however, are inaccurate for the reasons already described.

It is therefore an object of this invention to provide a method and apparatus of measuring the leak rate in a vessel where the air space volume in the vessel is not known. The method of the invention is carried out by supplying air to the vessel to pressurize it to a preset pressure, measuring the mass air flow to obtain a value proportional to the air space volume, measuring the pressure decline rate caused by fluid leakage, and calculating the leak rate from the air flow amount and pressure decline rate.

The apparatus according to the invention comprises a pressurized air supply to fill the vessel to a preset pressure, a flow rate sensor measuring the air flow rate to the vessel, a pressure sensor measuring the vessel pressure, and a computer programmed to integrate the flow rate for determining the mass air flow which is proportional to the volume of the air space, to determine a limit defined as either an allowable pressure drop within a set time or an allowable time period for a preset pressure drop, to measure the time or the pressure drop, and to compare the measured value with the limit value to determine whether the leak rate is excessive.

Figure 2:
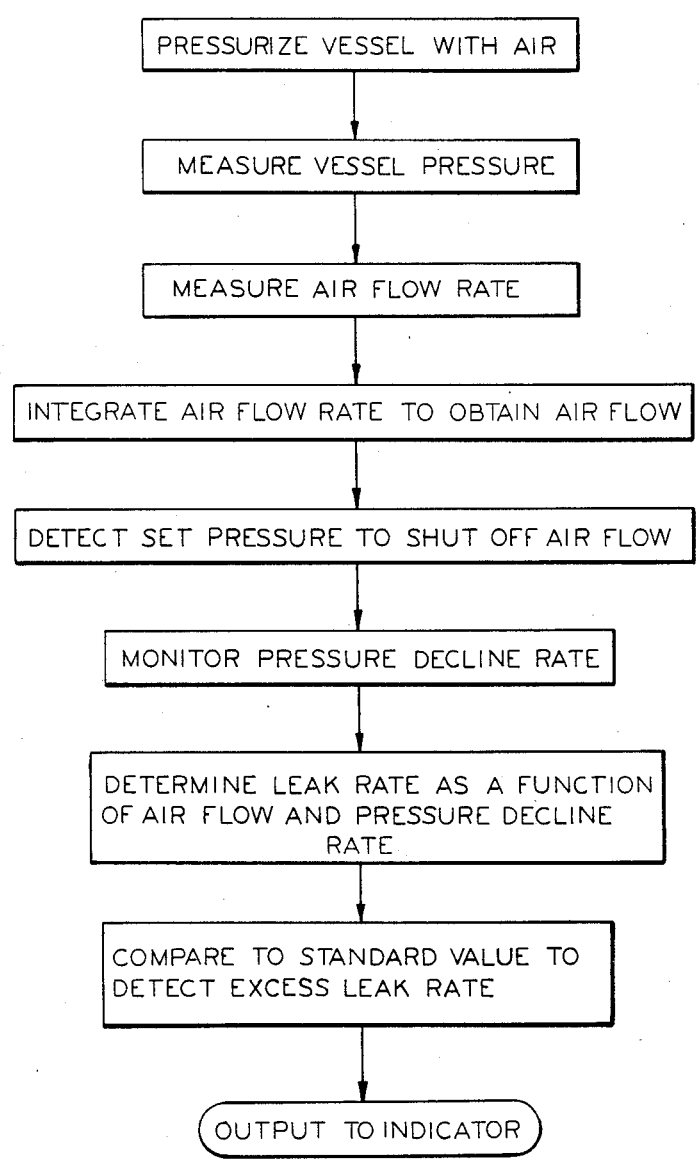

The above and other advantages will become more apparent from the following specification taken in conjunction with the accompanying drawings, wherein FIG. 1 is a schematic diagram of leak testing apparatus according to the invention; and FIG. 2 is a flow chart setting forth the steps of the method according to the invention.

Referring to FIG. 1, a vessel 10 which represents a transmission or other vessel undergoing a leak test is partially filled with fluid 12 thereby defining an air space 14 above the fluid 12. A pressurized air source 16 is connected through a downstream regulating air regulator valve 18 set for, say 10 psi, a flow rate transducer 20, and a solenoid operated on/off valve 22 to the vessel 10. A pressure transducer 24 measures the air pressure in the vessel 10. An electronic controller 26 which preferably includes a microprocessor-based computer has inputs from the flow transducer 20 and the pressure transducer 24 and has control outputs to the on/off valve 22 and to an indicator 28. The controller 26 is programmed to receive the mass air flow rate information from the transducer 20 and integrate the information to determine the mass air flow to the vessel 10 during the pressurizing mode of the operation. The computer is also programmed to receive the vessel pressure information and when pressure reaches a set amount, say 4 psi, to operate the valve 22 to shut off any further air flow to the vessel. Then, in the event of leakage from the vessel, the air pressure will decline and the rate of pressure decline is sensed by the controller. The leak rate is determined on the basis of the pressure rate decline and the mass air flow. The measured mass air flow allows a determination of the volume of the air space in the vessel. Then, with the volume being known, any increase of air space volume due to fluid leakage results in a pressure drop and a measure of the pressure rate of decline provides a measure of the rate of leakage. The permissible rate of decline for a given leak rate can be defined as a limit maximum presure drop over a preset time period or as a limit minimum time for a present pressure drop. Thus, a go/no go test can detect unacceptable leakage.

In practice, suitable apparatus for carrying out the invention comprises a Virtian Model FC910 mass flow transducer, a Virtian Model 029 pressure transducer, and a Modicon Model 084 microprocessor with a Modicon I/O interface for coupling to the transducers, the shut off valve and the indicator.

The method is applied to transmissions partially filled with transmission fluid with an air space above the fluid having a volume on the order of 1 to 4 liters. The transmission is coupled to an air supply having a pressure regulated to 10 psi by the regulator 18 and the mass air flow rate to the transmissiosn is measured by the transducer 20. When the pressure in the air space reaches 4 psi gauge pressure as sensed by the pressure transducer 24, the valve 22 is operated to shut off further air flow. Then, the pressure is monitored by the microprocessor for a set time on the order of 8 to 10 seconds. If during that time leakage causes a pressure drop greater than a preset value, a test fail signal is given to the indicator. The preset pressure drop limit depends on the allowable leak rate under test conditions. Leak rates on the order of 20 cc/min to 100 cc/min may be chosen. Then, the allowable pressure drop for a given test period is readily calculated.

FIG. 2 sets forth the steps of the method of measuring leak rate and detecting excess leak rate. The first steps are to pressurize the test vessel, measure the air flow rate and measure the pressure in the vessel. The remaining steps are performed by the computer and represent the necessary computer program. These steps are to integrate the air flow rate to obtain air flow, detect a set pressure to shut off air flow, monitor pressure decline, determine leak rate as a function of the air flow and pressure decline rate, compare the leak rate to a standard value to detect excessive leak rate and, finally, to produce a control output to actuate an indicator.

It will thus be seen that according to this invention, the leak rate of fluid from a closed vessel can be accurately measured by a simple method and apparatus even though size of the air space in the vessel is not known.

The embodiments of the invention in which an exclusive property or privilege is claimed are defined as follows:

1. The method of measuring the leak rate of fluid from a vessel having an unknown air space volume comprising the steps of filling the air space with air to a preset pressure, measuring the air flow amount during the filling step thereby obtaining a value proportional to the air space volume, after the filling step measuring the pressure decline rate caused by fluid leakage, and calculating the leak rate from the air flow amount and the pressure decline rate.

2. The method of testing the leak rate of fluid from a transmission partially filled with fluid and having an air space of unknown volume to determine whether the leak rate exceeds a pre-determined limit, comprising the steps of pressurizing the air space with air to a preset pressure, measuring the air flow amount required to pressurize the air space, thereby obtaining a measure of the air space, monitoring the pressure decline caused by fluid leakage over a time period to measure a variable value representing leakage, calculating from the measured air flow amount and a preset leak rate value, a limit value as a function of the pressure decline and time, and comparing the variable value with the limit value thereby determining whether the limit is exceeded.

3. Apparatus for testing the leak rate of fluid from a transmission having an air space of unknown volume comprising means for supplying air under pressure to pressurize the air space to a preset value, means for measuring the flow rate to the air space during the pressurizing step, means for measuring the pressure in the air space, and computer means connected to each measuring means and programmed to
  (a) integrate the measured flow rate to determine flow to the air space thereby determining the volume of the air space,
  (b) determine from the air flow and a preset leak rate limit, a limit value of a variable parameter in terms of an allowable pressure drop within a set time period or an allowable minimum time period for a preset pressure drop,
  (c) monitor the pressure decline to measure the variable parameter, and
  (d) compare the measured variable parameter with the limit value, thereby determining whether the leak rate is excessive.

4. Apparatus for measuring the leak rate of fluid from a vessel having an air space of unknown volume comprising means for pressurizing the vessel to a preset value by flowing air thereto, means for measuring the air flow rate to the vessel during the pressurizing step, and means for measuring the pressure in the vessel, and computer means connected to each measuring means and programmed to
  (a) integrate the air flow rate to obtain air flow thereby obtaining a measure of the volume of the air space,
  (b) monitor the pressure decline rate, and
  (c) calculate the leak rate from the measured pressure decline and the calculated air flow.

* * * * *